United States Patent

Paine et al.

[15] 3,656,781

[45] Apr. 18, 1972

[54] QUICK-DISCONNECT COUPLING

[72] Inventors: Thomas O. Paine, Administrator of the National Aeronautics and Space Administration with respect to an invention of; Allan R. McDougal, 5432 Vista Del Arroyo, LaCrescenta, Calif. 91501; Douglas P. Davis, 911 East Elmwood, Burbank, Calif. 91214

[22] Filed: Aug. 21, 1970

[21] Appl. No.: 66,004

[52] U.S. Cl. .................................. 285/3, 285/33, 285/316, 285/DIG. 21, 339/45 M, 339/91 B
[51] Int. Cl. ...................................................... F16l 37/22
[58] Field of Search ........... 285/18, 3, 4, 2, 316, 33, DIG. 21, 285/277; 339/45 R, 45 M, 91 B

[56] References Cited

UNITED STATES PATENTS

| | | | |
|---|---|---|---|
| 3,497,862 | 2/1970 | Jeffner | 285/18 X |
| 2,921,436 | 1/1960 | Canner | 285/18 X |
| 3,023,030 | 2/1962 | Torres | 285/18 |
| 3,071,188 | 1/1963 | Raulins | 285/18 X |
| 3,347,566 | 10/1967 | Nelson | 285/316 X |
| 3,407,847 | 10/1968 | Snyder | 285/316 X |

FOREIGN PATENTS OR APPLICATIONS

| | | | |
|---|---|---|---|
| 1,011,786 | 12/1965 | Great Britain | 285/18 |
| 1,131,952 | 6/1962 | Germany | 285/316 |

*Primary Examiner*—Thomas F. Callaghan
*Attorney*—J. H. Warden, Monte F. Mott and John R. Manning

[57] ABSTRACT

A quick-disconnect coupling particularly suited for use in coupling umbilical leads, including electrical cables and fluid conduits, characterized by a pair of coaxially related coupling components interconnected through an annular array of balls operatively seated within an annular locking groove established by a radially extended shoulder, and maintained in operative disposition by an axially reciprocable circumscribing locking ring spring-biased into an operative disposition relative to the array. A particular feature of the instant invention resides in an embodiment which includes a sealed gas generator operatively associated with the locking ring for positively displacing the locking ring, relative to the array, for thereby achieving a release of the balls, and an axially displaceable, actuating sleeve so coupled with the generator that the generator also serves to initiate a positive separation of the coupling components as the balls are released.

4 Claims, 5 Drawing Figures

PATENTED APR 18 1972

ALLAN R. MC DOUGAL
DOUGLAS P. DAVIS
INVENTORS

ATTORNEYS

ALLAN R. MC DOUGAL
DOUGLAS P. DAVIS
INVENTORS

ATTORNEYS

QUICK-DISCONNECT COUPLING

ORIGIN OF INVENTION

The invention described herein was made in the performance of work under a NASA contract and is subject to the provisions of Sec. 305 of the National Aeronautics and Space Act of 1958, Public Law 85-568 (72 Stat. 435; 42 U.S.C. 2457).

BACKGROUND OF THE INVENTION

1. Field of the Invention

The present invention relates to quick-disconnect couplings and more particularly to a gas-operated, quick-disconnect coupling particularly suited for use in coupling umbilical leads including electrical cables and fluid hoses.

2. Description of Prior Art

The prior art is replete with quick-disconnect couplings of various types for use in coupling umbilical leads. Such types include couplings which utilize arrays of spring-biased tangs and balls seated in annular grooves and similar detents. Normally the tangs and balls are retained in such a seated disposition through the use of axially reciprocating sleeves. Frequently, such couplings include pyrotechnic devices employable in achieving a separation of the coupling components. In many instances an explosive separation is achieved in a manner such that gas and debris are injected into the atmosphere. In other instances, means are provided for accommodating a break-away mode of separation as tension is developed within the leads. However, the quick-disconnect couplings currently available fail to totally satisfy existing needs. This is particularly true where a coupling is utilized in uniting adjacent ends of umbilical conduits and operated in a manner such as to protect associated delicate equipment from deleterious effects of gas-generated debris and forces of shock, as well as to accommodate a predictable and positive separation of the united ends of umbilical conduits.

OBJECTS AND SUMMARY OF THE INVENTION

It therefore is an object of the instant invention to provide an improved quick-disconnect coupling.

It is another object of the instant invention to provide an improved quick-disconnect coupling having arranged therein an association of improved coupling components.

It is another object of the instant invention to provide a quick-disconnect coupling including therein a plurality of improved components interconnected in a improved combination of components associated in a manner such as to enhance effective, positive separation of umbilical conduits.

It is another object of the instant invention to provide an improved gas-actuated, quick-disconnect coupling, including a mechanically actuated back-up release mechanism for use in coupling umbilical conduits.

It is another object of the instant invention to provide a quick-disconnect coupling which includes a pair of coaxially related coupling components, joined by a seated array of a plurality of radially displaceable balls, an actuating sleeve, and a gas generator associated with said balls and said sleeve in a manner such that the balls are released and the components positively separated in response to an initiation of the generator.

These and other objects and advantages of the instant invention are achieved through mateable first and second coaxially related coupling components adapted to be interconnected through an annular array of balls positioned in openings formed within one of the components and seated against an annular shoulder extended from the other component, an hermetically sealed gas generator and a shock absorber mechanism associated therewith for positively achieving a separation of the components and a back-up system including structure adapted to function as lanyards for applying disconnecting pressure to the coupling in the event generator malfunction operatively is encountered.

DESCRIPTION OF THE PREFERRED EMBODIMENT

Figure 1:
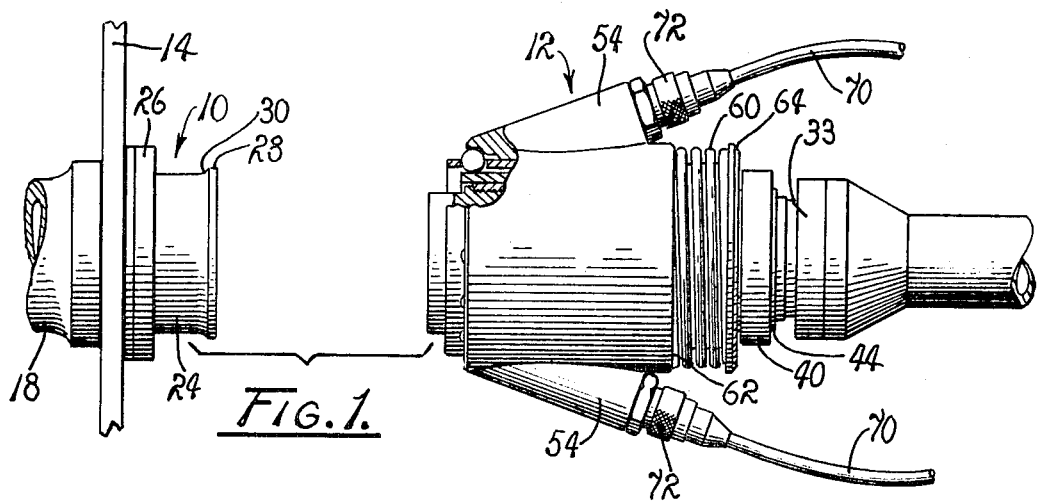
FIG. 1 is a partially sectioned view of a coupling embodying the principles of the present invention, illustrating the male and female units of the coupling in a state of separation.

Referring now to the drawings wherein like reference characters designate like or corresponding parts throughout the several views, there is shown in FIG. 1 a quick-disconnect coupling which embodies the principles of the instant invention.

The coupling includes a male unit 10 and a female unit 12, which operatively are axially mated to establish a completed conduit therethrough, and subsequently displaced into a mutually separated relationship, as illustrated in FIG. 1, for interrupting the established conduit.

As a practical matter, the coupling is capable of being employed in any environment wherein it is desired to separably connect operatively coupled conduits. However, the coupling has particular utility with umbilical conduits of a type including electrical cables and fluid hoses which serve temporarily to connect flight components such as space vehicles, space craft, and missiles with various types of launching devices including launch pads, booster motors and aircraft.

Figure 2:
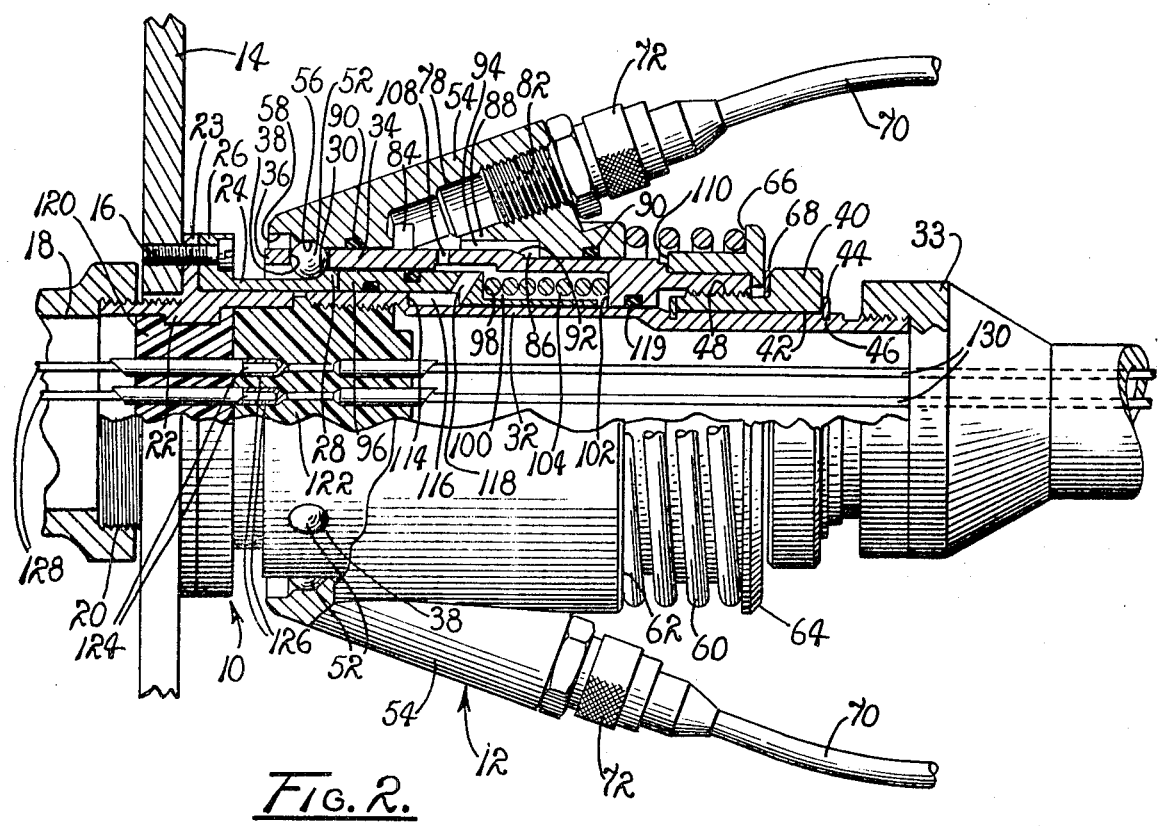
FIG. 2 is a partially sectioned view of the coupling of FIG. 1, on somewhat of an enlarged scale, illustrating the coupling units and their components in an operatively coupled state.

As illustrated, the male unit 10 of the quick-disconnect coupling supportingly is mounted on a fixed bulkhead 14, through mounting screws 16, and is connected with a terminal portion of a conduit 18 through a screw-threaded base portion 20 provided at an adjacent end of the male unit 10. The male unit 10 also includes a tubular coupling component 22, the external surface of which serves as the screw-threaded base portion 20, as best illustrated in FIG. 2. The component 22 includes an annular mounting flange 23 which receives therein the screws 16. Telescopingly received about the coupling component 22 there is a projected annular locking collar 24 having an annular mounting flange 26 including suitable openings aligned with the openings of the flange 23 and through which the mounting screws 16 are extended, thereby achieving a simultaneous mounting of the coupling component 22 and the collar 24.

The collar 24 projects beyond the telescoped end of the coupling component 22 and terminates in an external annular shoulder 28 defined by an annular, arcuate detent surface 30. The collar 24, at its projected distal end, also includes an internal annular surface for telescopingly receiving therein an adjacent external surface of a tubular coupling component 32 coaxially extended from the female unit 12 so that the male and female units 10 and 12, respectively, are caused to assume a mated relationship. In practice, the component 32 is coupled with a conduit 33 through suitable screw threads, not designated, in a manner similar to that in which the component 22 is coupled to the conduit 18.

In order to secure the units 10 and 12 in their axially mated relationship, a sleeve 34, having a projected end portion 36, is fixedly mounted within the female unit 12 in a manner such that the end portion 36 circumscribes the distal end of the collar 24 as the male and female units 10 and 12 are brought into an assembled operative association. The projected end portion 36 of the sleeve 34 is provided with an annular array of a multiplicity of radially extended, uniformly dimensioned bores 38, while the opposite end thereof is fixed to the coupling component 32 through a screw-threaded fitting 40.

The fitting 40 includes an axial bore 42 concentrically receiving therein the tubular coupling component 32. As a practical matter, the fitting 40 is secured against axial displacement, relative to the component 32, through a pair of axially spaced lock rings 44 seated in annular grooves 46. These rings accommodate rotational displacement of the fitting while serving as axial stops therefor. The fitting 40 further includes an externally screw-threaded surface 48 which receives a circumscribing, internally screw-threaded surface 50 provided within the sleeve 34, whereby the sleeve 34 threadably is supported by the fitting and is retained in a selected disposition relative thereto by the threads of the screw-threaded surfaces 48 and 50. It is, of course, readily apparent that since the fitting 40 is supported by the lock rings 44 the sleeve 34 can axially be displaced simply by rotating the fitting 40 about its axis for thereby imparting relative axial displacement between the surfaces 48 and 50.

Within each bore 38, of the annular array of bores, there is seated a ball 52. The balls 52 are of a common diameter and substantially fill the openings of the bores within which they are associated while protruding radially from the sleeve 34. As a practical matter, the arcuate detent surface 30 is provided with a radius slightly larger than that of the balls 52 in order to enhance mating of the balls with the shoulder 28 as they engage the surface 30.

In any event, it should readily be apparent that so long as the balls 42 remain seated within the bores 38, in a manner such that they engage the detent surface 30, extraction of the collar 24 from the end portion 36 of the sleeve 34 is prohibited. However, should radial displacement of the balls be accommodated, in a manner such that the surfaces of the balls become disengaged from the surface 30, axial extraction of the collar 24 from the end portion 36 of the sleeve 34 readily is achievable.

About the sleeve 34 there is provided an axially reciprocable actuator housing 54. This housing includes an internal bore, not designated, which concentrically receives therein the fixed sleeve 34 in a manner such that axial reciprocation between the sleeve and the housing can be effected. Within one end of the bore of the housing 54 there is provided an annular surface 56, which serves as a lock ring for engaging and thus confining the balls 52 within the bores 38. Adjacent to the surface 56 there is disposed a terminal annular surface 58 which is of a slightly greater diameter than the annular surface 56. This surface serves as a retainer ring for engaging the balls 52 as they radially are displaced from the detent surface 30 in achieving a release of the collar 24.

In practice, the actuator housing 54 is urged toward the male unit 10 by means of a compressible helical spring 60. The spring 60 is secured in place between an annular retainer face 62, formed on the housing 54, and an annular retainer 64. The retainer 64 is telescopingly received by the sleeve 34 and provides a radially extended annular face 66 which engages the spring 60.

While pins and the like can be employed quite satisfactorily for axially positioning the retainer 64, a radially extended shoulder 67 can, for this purpose, be provided at the terminus of the screw-threaded fitting 40. However, a washer 68 preferably is employed between the retainer 64 and the shoulder 67 of the screw-threaded fitting 40. In any event, it is to be understood that the retainer 64 is secured in a substantially fixed relationship with the sleeve 34 for confining the spring 60 in operative disposition in order that the annular surface 56 of the housing 54 continuously be urged into a confining relationship with the multiplicity of balls 52 for thereby retaining the balls 52 in a seated disposition within the bores 38 whereby the balls are retained in operative engagement with the detent surface 30 of the collar 24.

As should readily be apparent, reciprocation of the actuator housing 54, relative to the coupling component 32, readily is accommodated by forcibly collapsing the compression springs 60. As the housing 54 is advanced against the applied force of the compression spring 60, all of the balls 52 of the annular array simultaneously are released for radial displacement as the annular surface 58 axially is displaced into a circumscribing relationship therewith. This displacement permits the male unit 10 and the female unit 12 to be displaced in opposite axial directions.

As a practical matter, this displacement of the housing 54, relative to the coupling, can be achieved by applying to the actuator housing 54 an axially directed force acquired from an external source. Where so desired, flexible leads 70, which, in practice, include tubular cables adapted to function as lanyards, are coupled to the actuator housing 54 through screw-threaded fittings 72. These leads are employed, under tension, for applying an axially directed force to the housing 54 for thus causing the housing to advance against the force applied by the spring 60. This structure accommodates a mode of operation which is, in effect, a secondary mode of operation and readily is employable as a back-up system in the event malfunction of the system operating in its preferred mode is experienced.

In its preferred mode of operation, displacement of the actuator housing 54 is achieved through an initiation of suitable gas generators, preferably a plurality of squibs 74. The squibs 74 are mounted within suitable retainers 76 screw-threadedly received within firing chambers 78. These chambers are formed as bores obliquely extended into the body of the actuator housing 54. As a practical matter, the squibs 74 simultaneously are initiated in response to an electrical signal delivered through electrical leads, not designated, concentrically extended through the cables of flexible leads 70. Since the design and function of squibs are well known, a detailed description is omitted in the interest of brevity. However, it is to be understood that when initiated, the squibs 74 serve to generate within the chambers 78 predetermined quantities of rapidly expanding gases.

The specific number of squibs 74 employed can be varied as a matter of convenience. It is to be understood, however, that each of the firing chambers 78 is formed as a bore, preferably extending into a radial protrusion 80 formed as an integral portion of the actuator housing 54. The specific technique employed in fabricating the housing 54 is deemed to be a matter of convenience and therefore a detailed description also is omitted. However, each of the firing chambers 78 terminates in a screw-threaded opening 82, whereby the squibs 74 can be threadedly received within the opening thereof.

Each of the firing chambers 78 further is provided with an internal aperture 84, so disposed as to communicate with the internal bore of the housing. The firing chambers 78 also communicate with an annular groove 86 which extends about the internal surface of the actuator housing 54 in communication with the internal bore of the housing 54. This communication is established through a plurality of ports 88.

Consequently, as gas is generated within the firing chambers 78, a discharge thereof is accommodated through the apertures 84 as well as the ports 88. In order to effectively preclude an escape to atmosphere the gases are confined by an hermetically sealed relationship established between the surface of the bore of the actuator housing 54 and the external surface of the concentrically related sleeve 34. Such a relationship is achieved through a use of a plurality of O-ring seals 90 appropriately seated between the adjacent surfaces in a manner well within the skill of the art.

The external surface of the sleeve 34 located opposite the groove 86 also is provided with an annular surface 92 which, in cooperation with the radially extended surfaces of the groove 86, defines an axially expandable chamber 94 communicating with the firing chambers 78 through the ports 88. Since the annular surface 92 must remain substantially stationary, relative to the coupling component, due to the coupling of the screw-threaded surface 50 to the screw-threaded fitting 40, gas delivered into the chamber 94 via the ports 88 serves to drive the housing 54 in an axial direction, away from the male unit 10, for thereby causing the spring 60 to be compressed. As the gas pressure is relieved within the expandable chamber 94, the spring 60 becomes effective for driving the housing in a reverse direction for thereby advancing the actuator housing 54 toward the male unit 10. Thus, the housing 54 operatively is reciprocated relative to the coupling unit 32 of the female unit 12.

As the housing 54 is advanced in a spring-compressing direction, the balls 52 are released for radial displacement, within the bores 38, and are received within the annular surface 58 which serves as a retainer ring for the balls. Hence, the collar 24, as well as the coupling component 22, is released for axial displacement away from the coupling component 32 for achieving a separation of the male and female units 10 and 12, respectively. In the event tension simultaneously is applied to the leads 70, separation of the male and female units readily is effected, however, under certain operative conditions it may be required to achieve separation without developing tension within the leads 70. Consequently, the female unit 12 is provided with an axially reciprocable actuating sleeve 96 concentrically arranged between the sleeve 34 and the coupling component 32.

The actuating sleeve 96 coaxially is related to the collar 24 and abuts the distal end thereof, so that as axial displacement is imparted to the actuating sleeve, relative to the coupling component 32, such displacement also is imparted to the collar 24, so long as the collar 24 circumscribes the adjacent end portion of the coupling component 32. In its fully actuated state, the actuating sleeve 96 protrudes beyond the array of bores 38 and engages the balls 52 about its external surface for thereby supporting the balls in a retained disposition between its external surface and the annular surface 58. Thus the sleeve 96 also serves as a retainer for the balls once the collar 24 is extracted from the female unit 12.

In practice, the actuating sleeve 96 is provided with an annular shoulder which provides an annular surface 98 for an axially expandable actuating chamber 100, while the sleeve 34 is provided with an annular surface 102 coaxially related to the surface 98. Since the sleeve 34 is fixed relative to the coupling component 32 and the actuating sleeve 96 is permitted to experience reciprocation along the external surface of the coupling component 32, the actuating chamber 100 defined between the surface of the shoulder 98 and the surface of the shoulder 102 is, in effect, an expandable chamber having an instantaneous axial dimension dictated by the axial displacement imparted to the sleeve 96.

Within the chamber 100 there is arranged an helical compressing spring 104. This spring abuts the surfaces 98 and 102 and is compressed as the collar 24 is advanced against the sleeve 96 during a mating of the male unit 10 with the female unit 12. Conversely, the spring is permitted to expand as the collar 24 is extracted from the female unit 12. Therefore, it is to be understood that the spring 104 at all times engages the surface of the shoulder 98 and continuously urges the actuating sleeve 96 in a direction such as to expel the collar 24 from the female unit 12. Hence, as the actuator housing 54 is advanced against the action of the spring 60, the actuating sleeve 96 serves to forcibly displace the collar 24 from the female unit 12. This displacement is accommodated as the balls 52 are released for radial displacement as a consequence of an axial displacement being imparted to the actuator housing 54.

For reasons which are readily apparent, the spring 104 may, under certain operative conditions, not possess sufficient energy to expel the collar 24. Therefore, the actuating sleeve 96 also is adapted to communicate with the firing chamber 78 in order that the expanding gas generated by initiation of the squib 74 be utilized for purposes of positively driving the actuating sleeve 96 in a collar-expelling direction.

In order to accommodate a utilization of the expanding gases developed within the firing chamber 78, the actuating chamber 100 is provided with a passageway extending through the circumscribing sleeve 34. This passageway includes an annular groove 106 formed within the internal surface of the sleeve 34 and a plurality of communicating ports 108 extending radially from the annular groove 106 through the sleeve 34. The ports 108 axially are aligned with the apertures 84 and are so spaced as to become coaxially aligned therewith at the instant the balls 52 are released for radial displacement.

Since it is intended that the actuating sleeve 96 be advanced only after the balls 52 are released for radial displacement, the ports 108 are disposed at positions along the sleeve 34 such that they are caused to communicate with the array of apertures 84 only as the actuator housing 54 is advanced to a fully seated disposition against the spring 60. This position is defined by an annular shoulder 110 formed on the retainer 64 in an obstructing disposition relative to the path of the annular face 62 as the actuator housing 54 is advanced against the action of the spring 60.

At the instant the ports 108 are uncovered, through an appropriate positioning of the apertures 84, expanding gas is delivered through the ports 108, into the annular groove 106 and thence into the actuating chamber 100. As the expanding gas, now generated within the chambers 78, is permitted to penetrate the chamber 100 it acts against the surfaces 98 and 102 whereupon the actuating sleeve 96 is forcibly advanced toward the male unit 10. This advancement, of course, serves to effectively eject the collar 24 from the female unit 12.

In practice, it has been found particularly desirable to provide the actuating sleeve 96 with a radially extended stop shoulder 112 which serves to limit collar-ejecting displacement of the sleeve 96. The stop shoulder 112 oppositely is related to an annular shoulder 114 which circumscribes the external surface of the coupling component 32. The shoulders 112 and 114 are adapted to be brought into face-to-face engagement for arresting axial displacement of the actuating sleeve 96.

Due to the fact that the spring 104 urges the stop shoulder 112 toward an operative engagement with the annular shoulder 114, and during coupling the stop shoulder 112 is retracted from the annular surface 114 there is a tendency to entrap air between the axially displaced surfaces of the shoulders 112 and 114. Consequently, an air-filled annular chamber 116 is caused to be defined between the shoulders as a compression of the spring 104 is achieved. In order to avoid a resulting oscillation, as the spring 104 is rendered effective for driving the actuating sleeve 96 in a collar expelling direction, a bleed port 118 is extended between the annular chamber 116 and the annular groove 106 for purposes of permitting the annular chamber 116 to communicate with the actuating chamber 100 whereby an exchange of gases therebetween is accommodated and the resulting oscillation is precluded. While, as can readily be appreciated, a back-pressure of a determinable magnitude is developed within the chamber 116 during the advancement of the sleeve 96, the surface area of the surface 98 is more than adequate for overcoming the thus established back-pressure and to force the entrapped air to escape through the bleed ports 118. In order to further assure an hermetic sealing of the actuator housing 54, additional O-rings 119 are provided at appropriate locations between adjacent and mutually displaceable surfaces.

It is important to note that under certain operative conditions, it may be found desirable to effect a manual separation or uncoupling of the male and female units 10 and 12, respectively. Therefore, the quick-disconnect coupling of the instant invention also can be uncoupled manually, simply by grasping and advancing the housing 54 in a direction away from the male unit 10, whereupon the balls 52 are released from engagement with the circumscribing surface 56. As this advancement is completed, the surface 58 is brought into radial alignment with the balls in order to accommodate a simultaneous radial displacement of balls. In order to effect an uncoupling of the male and female units 10 and 12, through an axial displacement of these units, an outward camming of the balls 52 occurs as the shoulder 28 of the collar 24 is passed therebeneath, whereupon a release of the shoulder 28 and simultaneous separation of the units are achieved.

Figure 3:
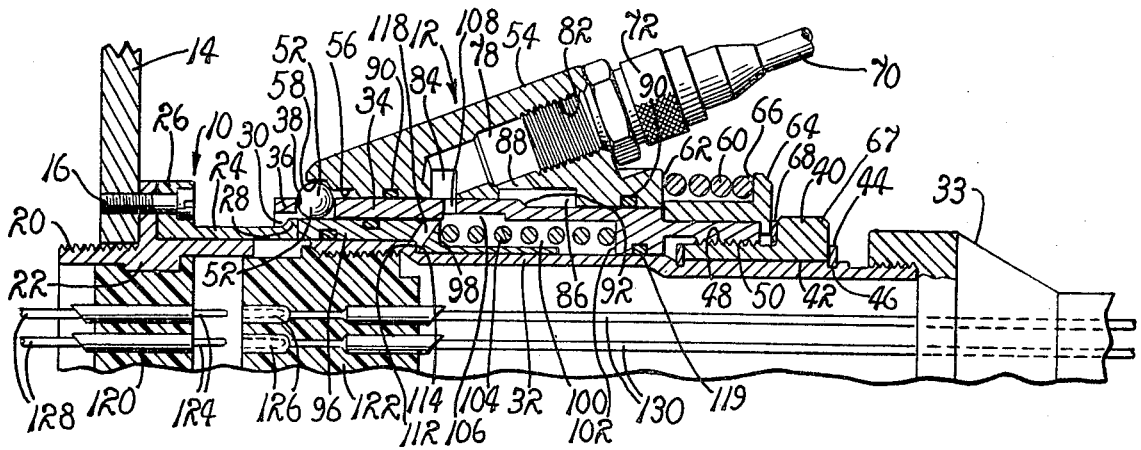
FIG. 3 is a fragmentary view of the coupling of FIGS. 1 and 2, illustrating a disposition assumed by the components of the units as they mutually are displaced.
Figure 4:
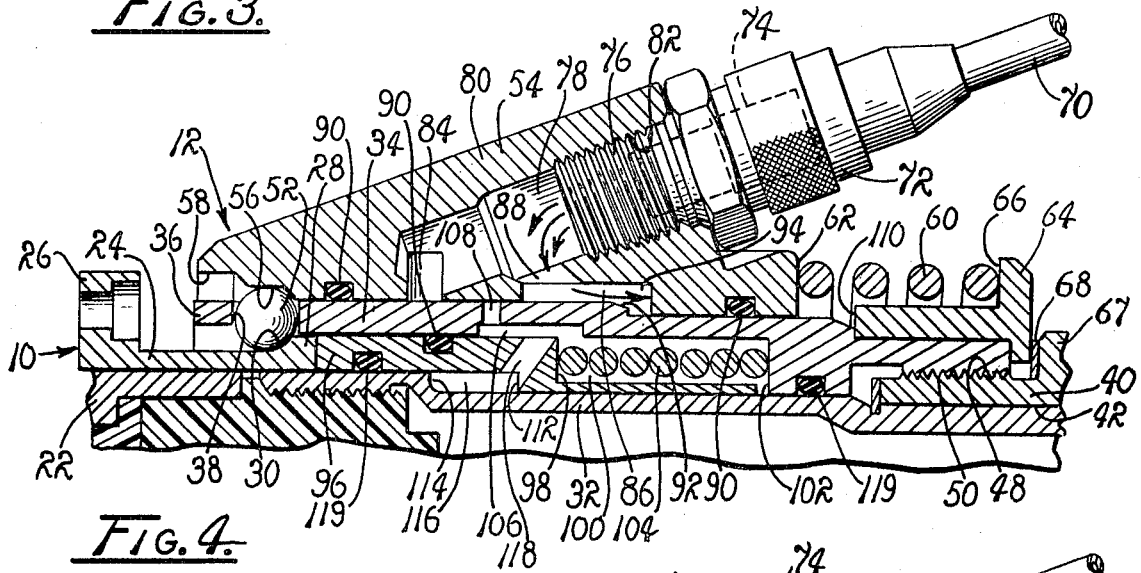
FIG. 4 is a fragmentary view, on somewhat of an enlarged scale, of the coupling illustrated in FIG. 2.
Figure 5:
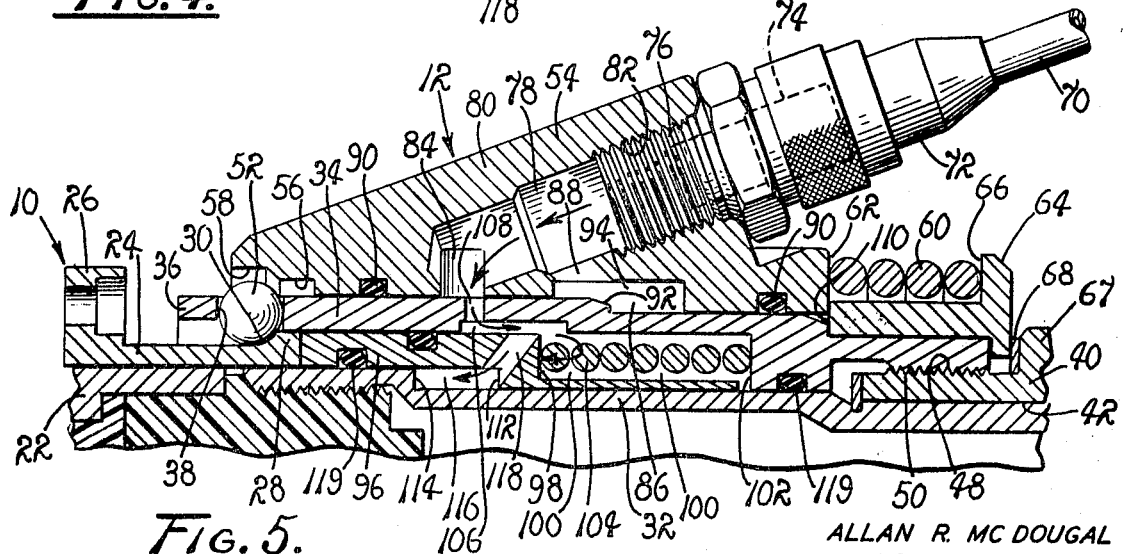
FIG. 5 is a fragmentary view of the coupling illustrated in FIG. 4, as a disassociation of the units is initiated.

Of course, when separating the male and female units 10 and 12, respectively, the spring 104 becomes effective for advancing the actuating sleeve 96 in a manner such that its external surface engages the surface of the balls 52 for engaging and retaining the balls between the external surface of the sleeve 96 and the annular surface 58, as illustrated in FIG. 3.

Conversely, the male and female units 10 and 12 are brought into a mated relationship by first grasping and then advancing the housing 54 in a manner similar to that heretofore described with respect to achieving a manual separation of the male and female units 10 and 12, respectively. Once the desired displacement of the housing 54 has been effected, the units 10 and 12 are brought into a coaxial relationship and an insertion of the collar 24, beneath the balls 52, is achieved, whereupon the internal surface of the collar matingly receives the adjacent end portion of the coupling component 32.

For illustrative purposes, the quick-disconnect coupling illustrated in the drawings includes therein electrical terminal blocks 120 and 122. These blocks are provided with electrical contacts including pins 124 and sockets 126, FIGS. 2 and 3, which, in turn, are associated with electrical leads 128 and 130 in a manner consistent with known designs for such terminal blocks. Since the pin and socket coupling forms no specific part of the instant invention, a detailed description is omitted. Furthermore, it is to be understood that even though not illustrated the quick-disconnect coupling which embodies the principles of the instant invention can be employed with hydraulic unions equally as well as with electrical terminal blocks.

OPERATION

It is believed that in view of the foregoing description, the operation of the coupling will be readily understood and it will be briefly reviewed at this point. In operation, the male unit 10 is mounted on a bulkhead 14 and is coupled with a given conduit 18, while the female unit 12 is supported at the distal end of a given conduit 33. Of course, it should readily be apparent that a reversed arrangement could be provided simply by coupling the female unit 12 directly to a bulkhead 14 and supporting the male unit 10 through the conduit 18.

Assuming that the balls 52 are seated on the external surface of the actuating sleeve 96 and the housing 54 is in its disposition, wherein the balls are confined by the surface 58, the male unit 10 and female unit 12 are mated by axially advancing the collar 24 into engagement with the actuating sleeve 96 with a force adequate to compress the spring 104 through a distance sufficient to permit the balls 52 to drop into engagement with the detent surface 30 of the collar 24. Subsequent to a dropping of the balls 52 into engagement with the surface 30, the housing 54 is displaced in a direction such that the annular surface 56 is caused to circumscribe and engage the balls 52 for thereby completing the coupling.

It is important to understand that the pins 124 and sockets 126 can, where desired, be so dimensioned that an electrical coupling therebetween can be achieved only by torquing the fitting 40 sufficiently to advance the coupling component 32 through a distance adequate for forcing the pins 124 and sockets 126 into a mated relationship. Such torquing thus effects a switching function.

Squibs 74 are seated within a retainer 76 and threadably inserted into the firing chambers 78. With this seating thus achieved, the cable leads 70 are coupled to the external surface of the actuator housing 54 through the internally screw-threaded fittings 72. The squibs 74 also are coupled, through the leads 70, with a suitable source of electrical energy, not shown.

With the coupling thus assembled separation of the male and female units 10 and 12, respectively, is achieved simply by delivering an electrical signal to the squibs 74 for initiating the squibs, whereby rapidly expanding gas is developed within the firing chamber 78. This gas advances through the ports 88 into the expandable chambers 94 for causing the chambers to axially expand, whereupon the housing 54 positively is advanced toward the compression spring 60, and away from the male unit 10. As the actuator housing 54 thus is advanced, the balls 52 simultaneously are released from confinement by the annular surface 56, whereupon the annular surface 58 axially is brought into radial alignment with the array of released balls.

As the actuator housing 54 is advanced toward the spring 60 the face 62 of the housing 54 is seated in an abutting engagement with the shoulder 110 of the retainer 64. Such seating of the housing 54 causes the apertures 84 to coaxially align with the plurality of ports 108 so that a passage of the gas now being expanded within the firing chambers 78 is accommodated through the ports 108 for delivery into the actuating chamber 100 via the groove 106. This delivery of gas serves to impart advancing displacement to the actuating sleeve 96, in a collar-ejecting direction. As the actuating sleeve 96 is so advanced, the collar 24, and hence the shoulder 28, of the male unit 10 is ejected from the female unit 12. As an ejection of the male unit occurs, the balls 52 are seated in fixed engagement with the annular surface 58, due to the resulting disposition assumed by the external surface of the actuating sleeve 96, once the sleeve has driven the collar 24 from the female unit 12.

Due to the presence of air entrapped between the adjacent annular surfaces of the shoulders 112 and 114, the bleed ports 118 are rendered effective for damping the oscillation effect which could normally be expected to attend as the sleeve 96 is driven in a direction for expelling the collar 24.

It is possible, but unlikely, that the squibs 74 may not ignite on command or that a resulting quantity of gas generated within the firing chambers 78 not be sufficient to achieve a suitable separation of the male and female units 10 and 12. Consequently, tension developed within the cables of the leads 70, resulting from an externally induced separation of the associated hardware, is, in most instances, sufficient for axially displacing the actuator housing 54 against the applied force of the spring 60. This displacement repositions the surface 58 and permits the balls 52 to be released from engagement with the detent surface 30 of the collar 24, whereupon an axial ejection of the collar 24 from the female unit 12 is accommodated. Hence, separation of the male unit 10 from the female unit 12 is achieved in a back-up mode.

Furthermore, where it is found desirable to separate the units 10 and 12 without initiating the squibs 74, and without tensioning the leads 70, the housing 54 is grasped and manually advanced away from the unit 10 for advancing the surface 58 to a position wherein the balls 52 are arranged in a radial alignment with the annular surface 58. The balls 52 now are cammed outwardly as separation of the units 10 and 12 is achieved.

In view of the foregoing, it should readily be apparent that the instant invention provides a simplified quick-disconnect coupling which has particular utility in joining adjacent ends of umbilical conduits, including both electrical and fluid conduits, and which can be operated in a primary or back-up mode, for achieving an uncoupling of the coupling's male and female units 10 and 12, respectively.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A quick-disconnect coupling comprising:
   A. a first tubular component having a distal portion and a base portion axially spaced from the distal portion adapted to be coupled with an adjacent end of a first given conduit;
   B. means defining a coupling collar externally circumscribing said distal portion and having an annular shoulder radially extended therefrom;
   C. a second tubular component having a terminal portion coaxially related to the distal portion of said first tubular component and an extended base portion spaced from said terminal portion including means for coupling the base portion with a second given conduit;

D. a locking sleeve concentrically related to said second tubular component and fixedly coupled in a radially spaced relationship therewith having an extended annulus telescopically receiving said annular shoulder of said coupling collar in concentric relationship therewith;
E. means defining within said locking sleeve adjacent to said extended annulus an annular array of radially extended bores;
F. a multiplicity of radially displaceable balls each releasably seated in one bore of said annular array of bores and supportingly engaged by said annular shoulder for supporting said shoulder against axial displacement relative to said extended annulus;
G. an actuator housing having an internal surface of a substantially tubular configuration telescopically receiving therewithin said locking sleeve and positionable between a first position adjacent to said first tubular component and a second position axially spaced from said first position;
H. means defining within the internal surface of said housing an annular locking ring circumscribing said balls and confining the balls within said array of bores when said housing is positioned in said first position;
I. resilient means operatively coupled with said actuator housing for continuously urging said housing toward said first position;
J. a pressure-responsive actuating sleeve interposed between said locking sleeve and said tubular component and supported for reciprocating motion in opposed axial directions including an annular distal surface disposed in abutting engagement with said coupling collar;
K. means defining between the internal surface of said actuating sleeve and the external surface of said second tubular member an hermetically sealed damping chamber of an annular configuration having an instantaneous axial dimension determined by the position of said actuating sleeve relative to said second tubular component;
L. means defining between the external surface of said actuating sleeve and the internal surface of said locking sleeve an hermetically sealed, axially expansible actuating chamber of an annular configuration arranged adjacent to said damping chamber in coaxial relation thereto, the instantaneous axial dimension of said chamber serving to determine the axial position of said actuating sleeve relative to said locking sleeve;
M. biasing means seated in said actuating chamber for continuously urging said actuating sleeve toward said coupling collar;
N. a gas generator including means defining a firing chamber within said actuator housing for confining therein gas under pressure;
O. means for imparting axial motion to said actuator housing against said resilient means for advancing said housing from said first position to said second position, including means defining a pressure-responsive expansion chamber communicating with said gas generator, whereby gas confined within the firing chamber is delivered to said expansion chamber for advancing said housing to said second axial position;
P. means defining an interruptible gas delivery passageway extending from said actuator chamber through said locking sleeve to said firing chamber, whereby gas confined under pressure within said firing chamber is afforded delivery to said actuating chamber for axially expanding said actuating chamber so that said actuating sleeve responsively is advanced toward said coupling collar;
Q. means for interrupting said gas delivery passageway when said actuator housing is positioned in said first position, and for opening said gas delivery passageway as said actuator housing is advanced to said second position, whereby delivery of gas under pressure to said actuating chamber is controlled in response to positioning of said actuator housing; and
R. means defining motion damping ports extending between said actuating chamber and said damping chamber for accommodating an exchange of gas therebetween as the axial dimensions of said damping chamber and said actuating chamber are varied, whereby oscillation of said actuating sleeve is precluded.

2. The coupling of claim 1 wherein said actuating sleeve further includes a circumscribing ball supporting surface adapted to be displaced into simultaneous engagement with said multiplicity of balls as said annular shoulder of the coupling collar is displaced relative to said extended annulus.

3. The coupling of claim 1 further comprising means defining within the actuator housing a ball retention ring axially spaced from said locking ring adapted to circumscribe and simultaneously engage said multiplicity of balls as the ball supporting surface of said actuating sleeve is displaced into simultaneous engagement with the balls.

4. The coupling of claim 1 further including a back-up system associated with said housing for assuring a release of said balls, including a lanyard operatively coupled with said actuator housing and extended therefrom adapted to transmit externally developed, axially directed forces to said housing for thereby imparting axial displacement to the housing, relative to said locking sleeve, for effecting an axial displacement of said locking ring relative to said multiplicity of balls.

* * * * *